Nov. 25, 1930.  A. M. JOHNSON  1,782,573
MACHINE TOOL
Filed July 23, 1927    6 Sheets-Sheet 1

Inventor:
Albert M. Johnson
By Chindahl, Parker & Carlson
Attys

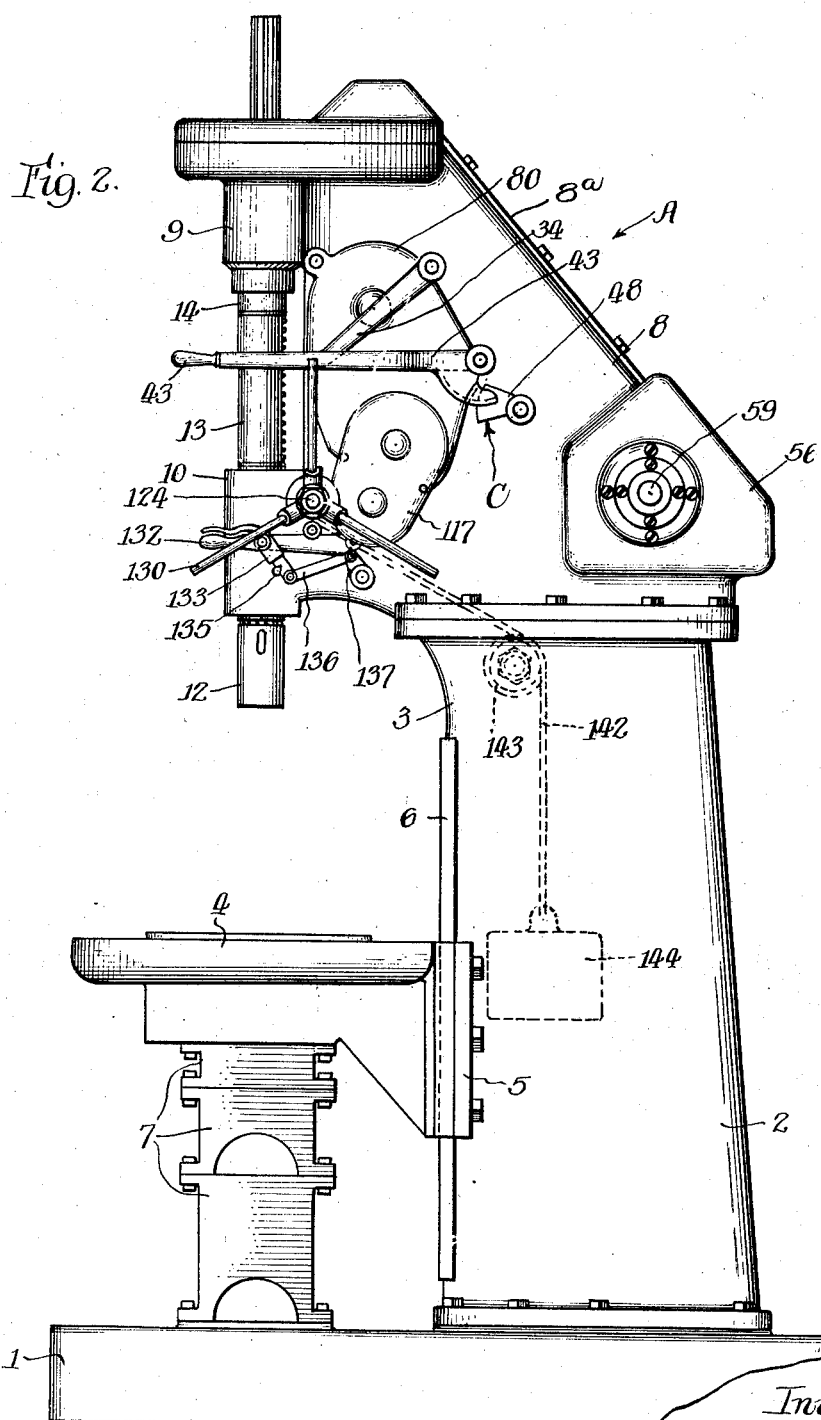

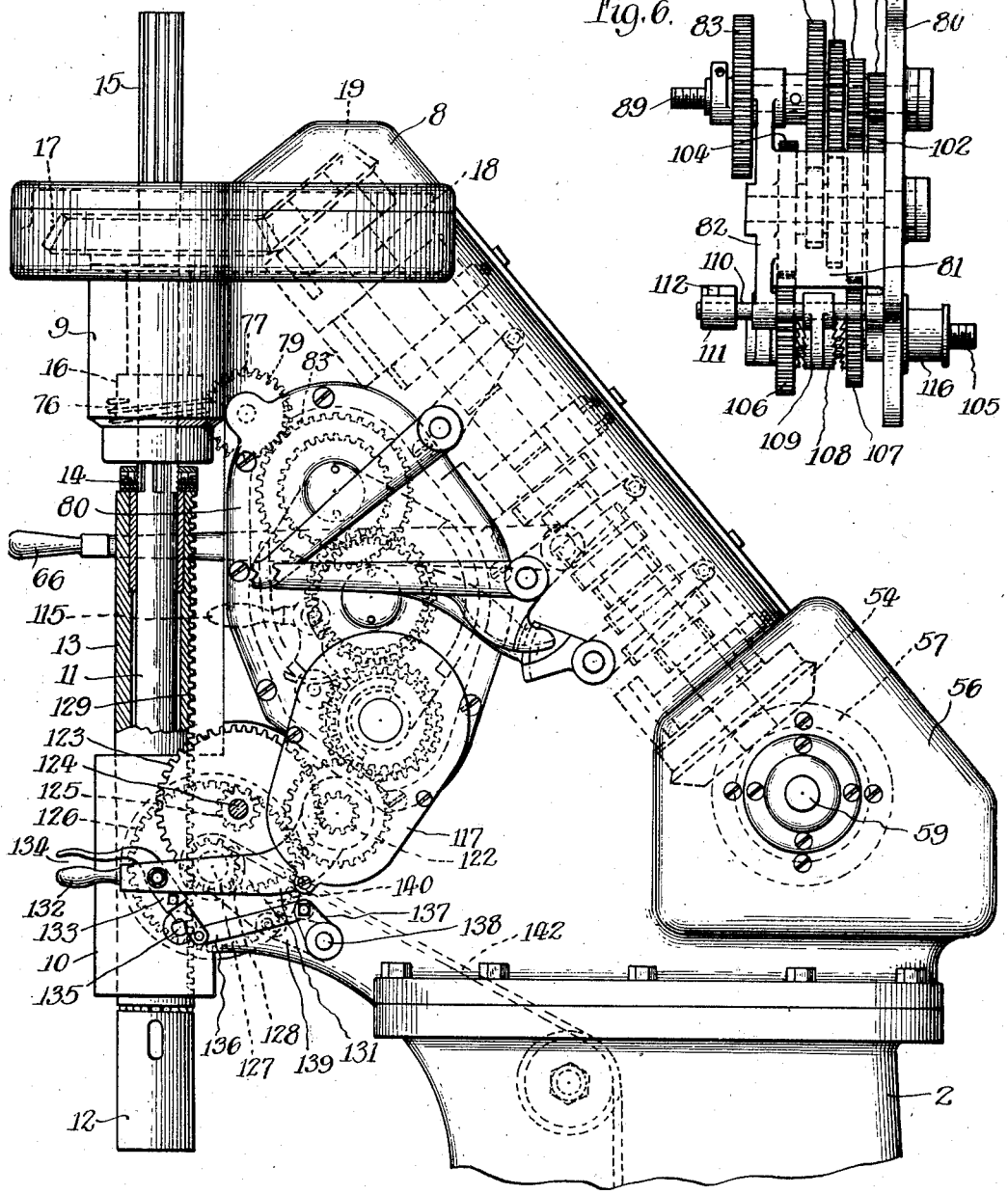
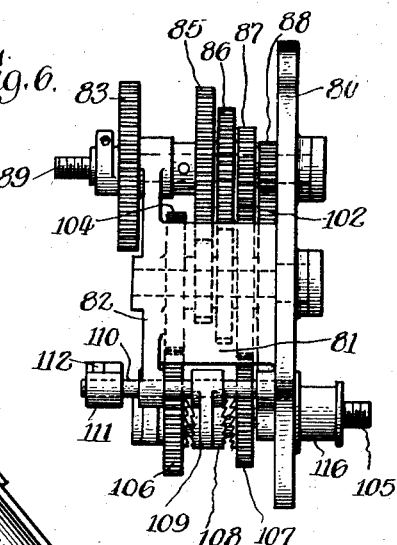

Nov. 25, 1930.  A. M. JOHNSON  1,782,573
MACHINE TOOL
Filed July 23, 1927   6 Sheets-Sheet 4

Inventor:
Albert M. Johnson,
By Churdahl Parker Carlson
Attys.

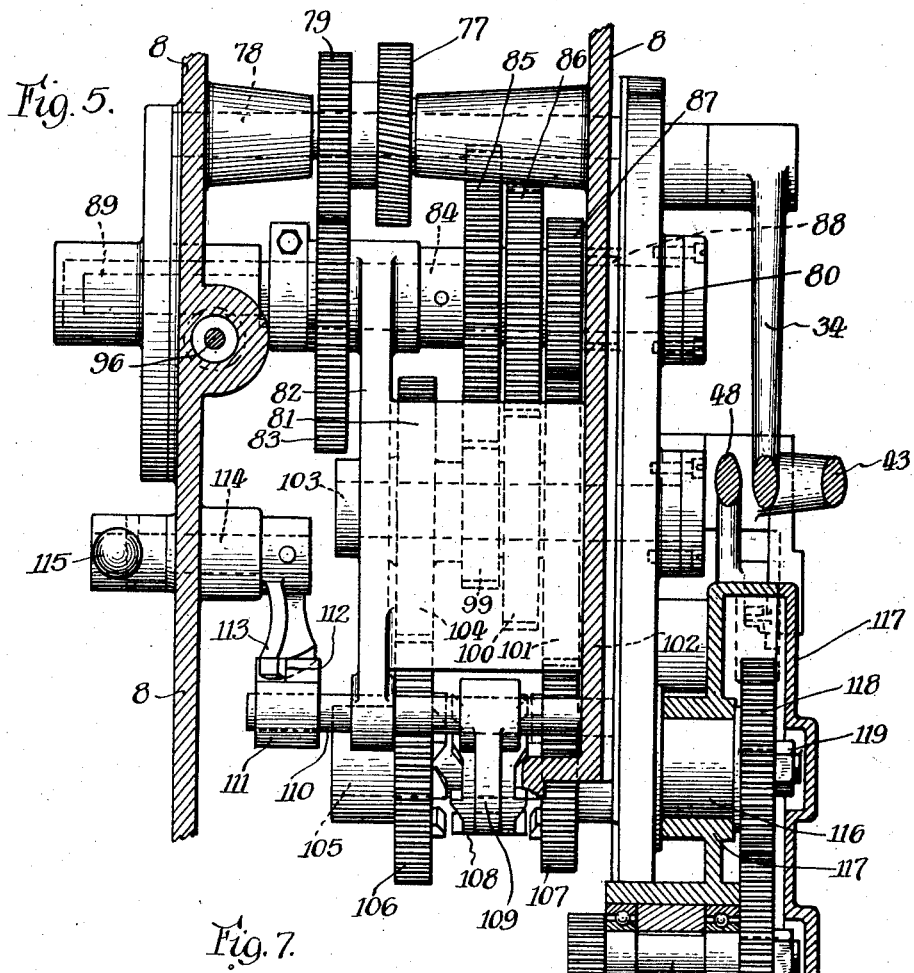

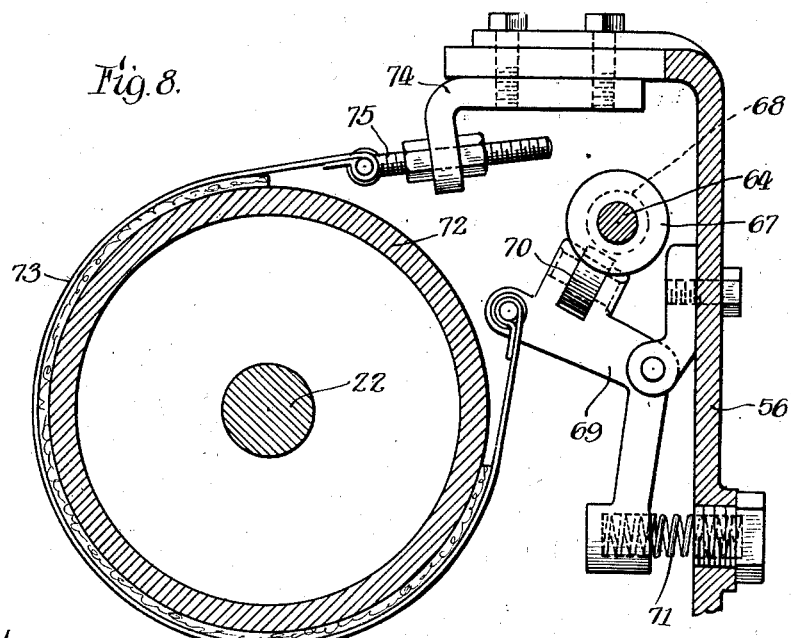
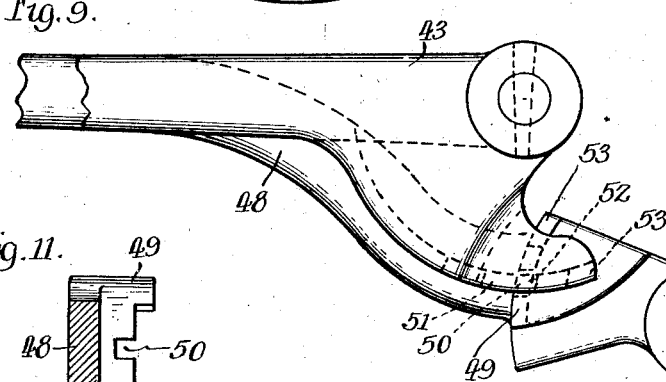
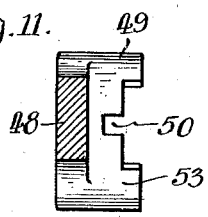
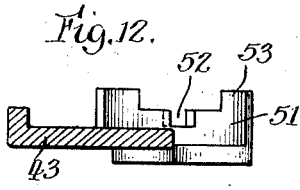
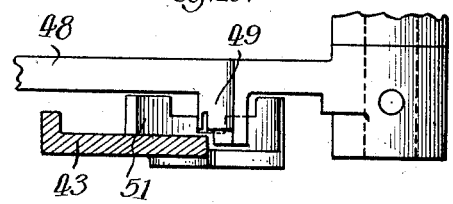

Patented Nov. 25, 1930

1,782,573

UNITED STATES PATENT OFFICE

ALBERT M. JOHNSON, OF ROCKFORD, ILLINOIS, ASSIGNOR TO BARNES DRILL COMPANY, OF ROCKFORD, ILLINOIS, A CORPORATION OF ILLINOIS

MACHINE TOOL

Application filed July 23, 1927. Serial No. 207,862.

The invention relates to machine tools of the type which are adapted to perform drilling, boring, reaming, and allied operations.

The principal object of the invention is to provide a unitary spindle supporting structure embodying improvements enabling an especially compact arrangement of the spindle operating mechanisms, with conveniently accessible controlling devices therefor, and having particular advantage when used either as an individual unit or in a multi-unit machine of the gang type designed for large production on similar work with a minimum of attendance.

Another object is to provide complete enclosure of the trains of change-speed and change-feed gears for operating the tool-holding spindle, such enclosure being arranged in compact form permitting the closely proximate mounting of several independent spindle units upon a single base.

Another object is to provide a unitary sub-structure carrying the change-feed gears, which is removable as a unit from the head casing for inspection and repair.

Another object is to provide an improved construction of change-speed and feed mechanisms so that all control levers are brought forward of the front of the supporting head structure for easy manipulation by an operator stationed before the machine.

Other objects and advantages will be apparent in the following detailed description of a preferred embodiment of the invention which has been selected for illustration in the accompanying drawings. It will be understood, however, that many changes in form construction and arrangement may be made by those skilled in the art without departing from the scope and spirit of the invention as expressed in the appended claims.

Referring to the drawings, Figure 1 is a front elevation of a two unit machine embodying the invention.

Fig. 2 is a side elevation of the same.

Fig. 3 is an enlarged side elevation of the unit head structure partially in section.

Fig. 5 is a fractional sectional front elevation of the head structure illustrating the spindle feed change-speed gear train.

Fig. 6 is a detailed view of the sub-structure carrying the change-speed gears in the feed train.

Fig. 7 is a fractional sectional view of the mechanism for selectively engaging the change-speed gears in the feed train.

Fig. 8 is a detailed view of the speed braking mechanism.

Figs. 9 to 12 inclusive, are detailed illustrations of the interlocking device for the speed change control levers.

Figure 1:
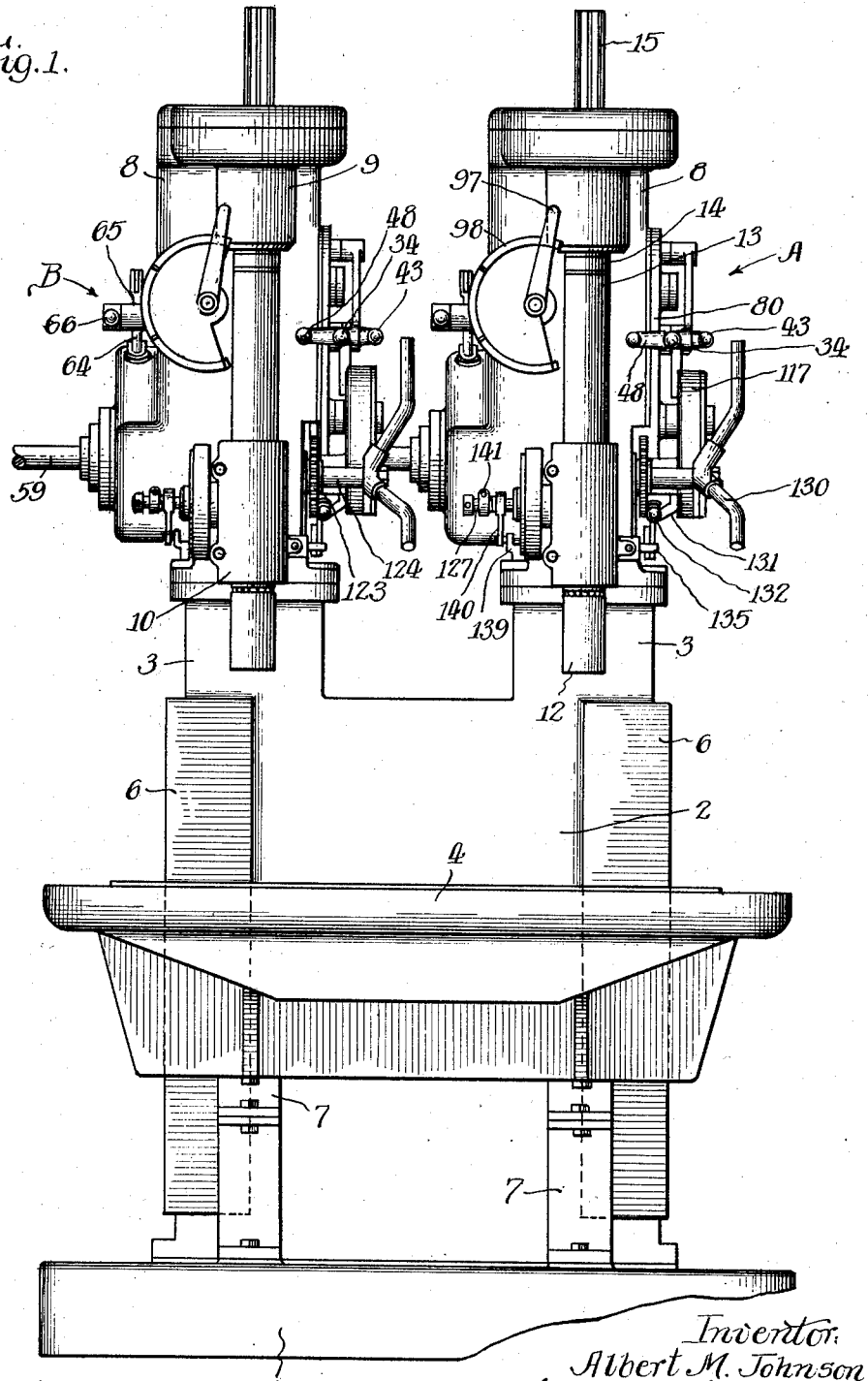

Referring to Figs. 1 and 2, the numeral 1 indicates a base upon which is mounted a support column 2, the upper portion of which is provided with a pair of spaced upwardly extending head casing supports 3. For convenience, the drawings herein illustrate the machine as provided with two unitary spindle structures, indicated generally at A and B. It will be understood that the base 1 and column 2 may be extended laterally to any desired length, and provided with any desired number of head casing supports 3 to accommodate any number of spindle heads, also that the base and column may be constructed to accommodate one spindle head in a single spindle machine. It will be noted that the column 2 is a unitary integral structure of unusual depth and of length depending upon the number of spindle heads mounted thereon, such provision giving a high degree of rigidity to the work supporting and spindle supporting structures, with assurance that all springing of the frame members under the strain of the operation of the tool is practically eliminated.

Forwardly of the column 2 is positioned a work supporting table 4 retained in its relation to the column 2 by means of interengaging ways provided on the proximate portion of the table 4 and indicated at 5 with the slide ways 6 provided on the front face at each end of the column 2, the slide ways 6 guiding the vertical movement of the table 4 in relation to the tool spindle. In machines having a greater number of spindle heads, it is advantageous to provide similar intermediate slide ways on the column and the work table.

Under support for work table 4 is provided by means of sectional column comprising a series of supporting blocks 7 which may be assembled in any desired combination of heights to position the table at the desired level. These blocks being of large cross-sectional area and rigidly bolted together, and likewise secured to the base and to the table, provide an extremely rigid adjustable support which practically eliminates any play in the work table under pressure from the operating tool.

Mounted upon each of the upwardly extending supports 3 is a unitary head casing 8 upon which are supported the tool carrying spindle, the mechanisms for operating the spindle, and the controls for those mechanisms. The several unitary head structures which may be so mounted in a gang drill are similar in construction and arrangement, and the detailed description of one will apply to all.

The head casing 8 is rigidly secured to its under support, and is provided on its front face with a pair of spaced forwardly extending bearing portions 9 and 10 within which a spindle assembly is supported for rotative and longitudinal reciprocal movement.

Referring to Figs. 1 to 3, the spindle 11 is provided at its lower end with a conventional tool holding chuck 12 and is rotatively supported within a reciprocatory sleeve 13, the latter having its bearing in the bearing portion 10 of the casing. The spindle 11 extends upwardly from the sleeve 13 a substantial distance, and is threaded immediately adjacent the upper end of the sleeve to receive a bearing collar 14 which is provided to hold the spindle in relative longitudinal position within the sleeve. The sleeve 13 is provided on its rearward side with rack teeth extending longitudinally of the sleeve, by which the longitudinal travel of the spindle is caused and controlled as hereinafter described.

The upper portion of the spindle 11 is provided with longitudinal grooves indicated at 15 which extend through a splined bearing collar 16, the latter having suitable rotative bearing support in the upper bearing portion 9 of the casing.

Above the bearing portion 9 of the casing in a bevel gear 17 having suitable bearing support in a housing forming part of the head casing, the gear being splined upon the upper end of the spindle 11. The gear 17 functions to impart rotative movement to the spindle.

Figure 4:
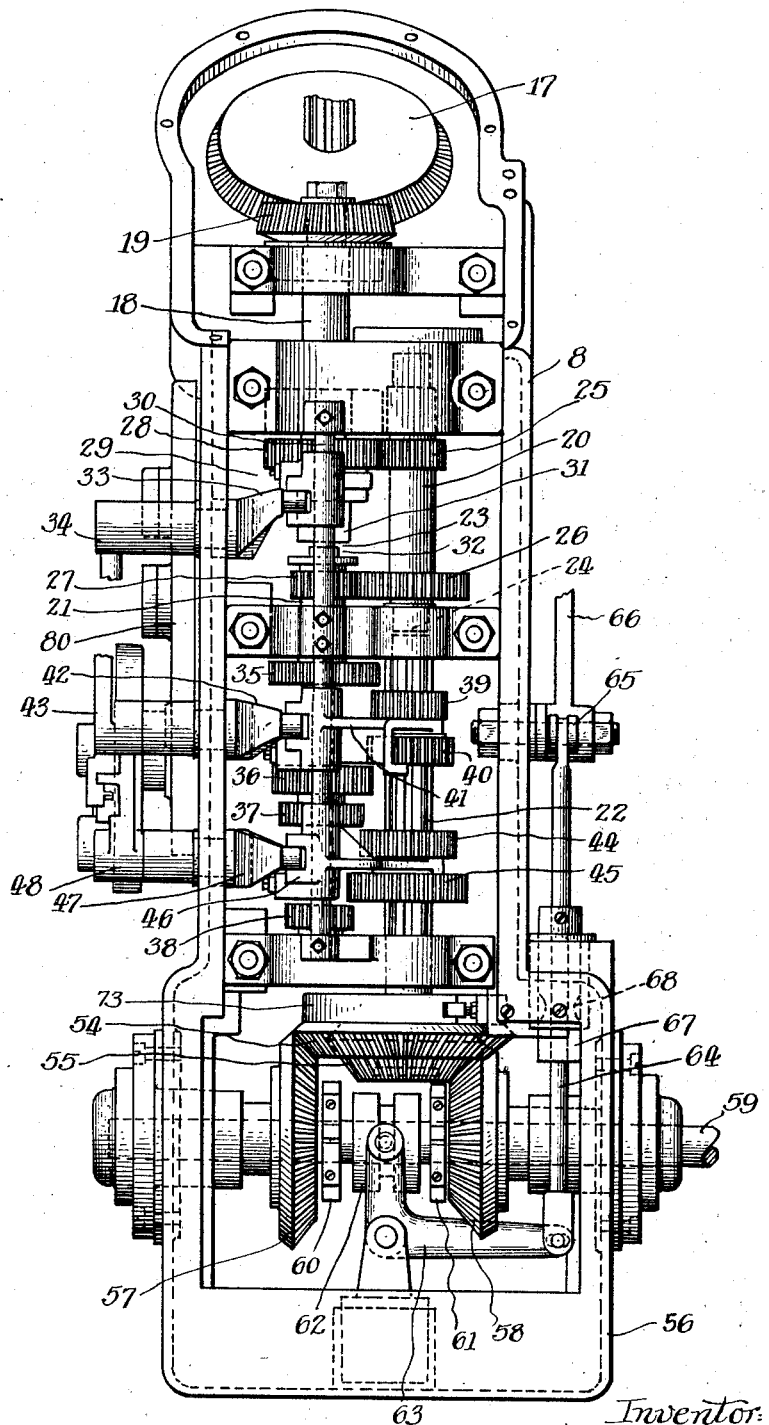
Fig. 4 illustrates the spindle driving mechanism and speed control devices as seen from above perpendicularly to the axis of the change-speed gear shafts and with the casing cover removed.

Angularly positioned in the rearward portion of the head casing 8 and housed therein is a drive shaft 18 having its bearings in suitable cross members provided in the casing. (See Fig. 4.) The drive shaft 18 carries a driving pinion 19 at its upper end in constant mesh with the bevel gear 17. Parallel to the shaft 18 is positioned a change-speed shaft 20 also having suitable bearings in the cross members of the casing. Alined with the shaft 18 is a third shaft 21, and parallel thereto is a fourth shaft 22, both having their bearings in the casing cross members. The adjacent ends of the respective pairs of shafts are indicated at 23 and 24. Preferably the shafts 18, 20 and 21 are arranged in horizontally spaced relation so that their axes define a plane whose intersection with a horizontal plane forms a line normal to the horizontal projections of said axes.

Preferably, the casing 8 is substantially in the form of a right isosceles triangle positioned with one of its sides vertical and having a removable upper wall $8^a$ sloping downwardly and rearwardly.

The upper shaft 20 is provided with a pair of spaced rigidly mounted change speed gears 25 and 26, the lower one 26 being in constant mesh with a gear 27 rigidly mounted on the upper end of the lower shaft 21. The upper gear 25 is selectively engaged with a gear 28 splined upon the shaft 18. The gear 28 is slidable into and out of engagement with the gear 25 by means of a yoke 29 of conventional construction and having a slidable bearing upon a guide rod 30 secured to the cross members of the casing.

The hub of the gear 28 is extended as indicated at 31 to form one member of a clutch device adapted to be moved into engagement with a complementary clutch member 32 formed on the side of gear 27 on the upper end of the lower shaft 21. The clutch members are so arranged that with the gear 28 moved downward out of engagement with the gear 25, the clutch members may be engaged to effect the direct drive of the upper shaft from the lower shaft. With the gears 28 and 25 engaged, the clutch members 31 and 32 are disengaged, and the upper shaft 18 is driven at reduced speed from the lower shaft 21 through the gears 27, 26, 25, and 28.

The shifting yoke 29 is controlled by means of a crank 33 having operative engagement with the yoke, the crank having its pivotal bearing in a side wall of the casing and carrying at its outer end a control lever 34 fixed thereupon and extending forwardly of the front portion of the casing for easy manipulation by an operator positioned before the machine.

The lower shafts 21 and 22 are provided with two independent sets of change-speed gears. The lower shaft 21 is provided with spaced gears 35, 36, 37, and 38 rigidly mounted on the shaft. Complementary to the upper two gears 35 and 36 are a pair of gears 39 and 40 adapted respectively for selective engagement therewith and being splined on the shaft 22. The splined gears 39 and 40, preferably of integral structure, are controlled by means of a conventional shifting yoke 41 slidably mounted on the rod 30. The yoke 41 is operated by a crank 42 operatively engaged therewith and pivotally mounted in the side wall of the casing, extending therethrough to receive in rigid attachment at its outer end a control lever 43 extending forwardly of the front face of the casing.

Complementary to the lower pair of gears 37 and 38 are a pair of sliding gears 44 and 45 of preferably integral structure and also splined upon the shaft 22. The position of the latter pair of gears is shifted by means of another conventional yoke 46, slidably mounted on the rod 30 and controlled by a crank 47. The crank 47 is pivotally mounted in the side wall of the casing and extends therethrough to receive in rigid attachment a control lever 48 also extending forwardly of the front portion of the machine.

It will here be observed that the arrangement of shafts and gears just described accomplishes a very compact construction of speed change mechanism for rotating the spindle and requires a minimum of housing space.

An interlocking mechanism, (see Fig. 2 and Figs. 9 to 12, inclusive) is provided between the change speed control levers 43 and 48, to avoid the possibility of accidental engagement of the two sets of change speed gears at the same time with obvious damaging results to the mechanism. The interlocking device is indicated generally at C, in Fig. 2.

Referring to Figs. 9 to 12 inclusive, the lower lever 48 is provided with a concentric flange 49 formed adjacent the pivot and having a slot 50 provided at its mid-portion. The upper lever 43 is also provided with a concentric flange 51 extending into interengaging relation with the flange 49 and suitably formed on a lateral extension of the lever structure. The flange 51 is also provided with a slot 52 so positioned that with both levers in neutral position, whereby both sets of change speed gears are out of engagement, the two slots are then in register. While in the latter position, it will be obvious that either lever may be moved in either direction, whereupon its respective flange moves through the slot provided in the other flange and thereby locks the other lever against movement until the first lever is again returned to neutral position. By this means there is no possibility of shifting both sets of change speed gears into mesh at the same time. The flanges 49 and 51 preferably are provided with stop lugs 53 adapted to limit the movement of the lever being shifted by engagement with the flange of the other lever.

The lower drive shaft 22 extends through its bearing in the lower one of the cross frame members of the casing and carries a pair of concentric bevel gears 54 and 55 rigidly mounted on its lower end and enclosed within a housing 56 formed in the lower rearward portion of the casing. The two bevel gears 54 and 55 are respectively in constant mesh with the bevel gears 57 and 58 freely mounted on the main shaft 59 extending laterally through the housing 56 and having suitable bearings in the side walls thereon.

Each of the gears 57 and 58 is associated with a clutch mechanism generally indicated at 60 and 61. These clutch devices may be of any desired conventional construction and are not herein described in detail. The clutches 60 and 61 are adapted to engage the gears 57 and 58 selectively with the shaft 59 by means of a clutch operating collar 62 mounted on the main shaft 59 and slidable into selective operative relation to either of the clutches. The selective position of the collar 62 is controlled by a bell crank 63 having pivotal support upon the lower wall of the housing. One arm of the bell crank 63 is formed to provide a yoke having conventional operative engagement with the collar 62. The other arm of the bell crank is pivotally attached to an operating rod 64 having a suitable bearing in the front wall of the housing 56 and extending therethrough into pivotal engagement with a crank arm 65 mounted on the outer wall of the casing 8 and having integral therewith a control lever 66 extending forwardly of the front portion of the head casing.

Within the housing, the rod 64 is provided with a cam collar 67 fixed thereupon and having an annular groove 68 provided in its mid-portion. Associated with the collar 67 is a bell crank 69 (see Fig. 8) mounted on the side wall of the housing and having its pivotal axis parallel to the longitudinal axis of the operating rod 64. The arm of the bell crank extending adjacent to the collar 67 is provided with a roller 70 pivotally mounted between suitable bearing extensions of the bell crank and having its axis in a plane perpendicular to the axis of the operating rod. The roller 70 is in constant contact with the face of the cam collar 67, and with the movement of the latter the roller passes into and out of the annular groove 68 with consequent movement of the bell crank 69. The other arm of the bell crank supports one end of a spring 71 confined under tension between the bell crank and the side wall of the housing, with the effect of resiliently retaining the roller in constant contact with the collar.

A brake drum 72 is rigidly mounted on the speed drive shaft 22, and cooperatively associated therewith is a brake band 73 having fixed attachment at one end of the wall of the housing by means of the bracket 74 and the adjustable eye-bolt 75. The other end of the brake band is secured to the arm of the bell crank 69 extending adjacent the collar 67. The cam collar 67 is so positioned upon the operating rod 64 that when the clutch collar 62 is in neutral position, the roller 70 is positioned in the groove 68, with the effect of tightening the brake band upon the drum and immediately stopping the movement of the spindle driving train. Movement of the operating rod 64 in either direction to engage either of the driving gears 57 and 58, moves the roller 70 outwardly upon the cam collar 67 and effects the release of the brake band from the brake drum.

The longitudinal feeding movement of the tool carrying spindle, the changing of speed of the feeding movement, and the downward limitation of that movement is accomplished by means now to be described. In its preferred form, this feeding mechanism is arranged to lie mainly beneath the angularly positioned shafts 18, 20 and 21 in the triangularly shaped space between the plane of the shafts and the drill spindle 11. The arrangement of these shafts in horizontal spaced relation makes it possible to produce an exceedingly compact drilling unit having a spur gear feeding mechanism embodying feed change means. The bearing collar 16 supporting the upper portion of the spindle 11 is provided on its outer periphery with a worm thread as indicated at 76, in Fig. 3. Operatively engaged with the worm is a worm gear 77 (see Fig. 5) mounted on a shaft 78 having suitable bearings provided on the opposite side walls of the head casing 8. Formed preferably integral with the worm gear 77 is a spur gear 79 also mounted on the shaft 78.

Operated by the gear 79, is a train of change-feed gears positioned within the casing 8 and supported as a unit upon a substructure having as its outer member the plate 80 (see Figs. 5 and 6) removably secured upon the margin of an opening in the side wall of the casing 8. Integral with the plate 80 is a web 81 extending inwardly of the casing and carrying a bearing bracket 82 spaced from the outer plate 80. A gear 83, having constant engagement with the driving gear 79, is rigidly mounted on a shaft 84 having its bearings in the upper end of the bearing bracket 82 and the outer plate 80. The shaft 84 also carries a plurality of change feed gears, in the present instance four in number and indicated at 85, 86, 87, and 88, the latter gears being rotatively mounted upon the shaft.

The shaft 84 is provided with an axial bore (see Fig. 7) within which is provided mechanism for causing selective engagement of the several change feed gears with the shaft. This means comprises a longitudinally slidable plunger 89 positioned in the bore 90 and having a series of annular rack teeth 91 provided in its outer end portion. The inner end of the plunger 89 is bifurcated to receive a gear engaging dog 92, one corner of the end portion of the dog being pivotally secured to the plunger. A compression spring 93, is seated in a suitable pocket in the plunger, bears under tension against the opposite corner of the end portion of the dog and tends to move laterally the outer end of the dog. The outer end of the dog is provided with a laterally extending gear engaging projection 94, which moves through a longitudinal slot in the shaft 84 and is adapted to be engaged selectively within longitudinal slots formed in the inner bearing surfaces of the gears 85 and 88. With the longitudinal movement of the plunger the gear engaging projection of the dog is drawn through the slot in the shaft for register with either of the change speed gears selectively, the dog being deflected into the bore, in passing from engagement with one gear to another, by spacing washers 94$^a$ interposed between the several gears.

The plunger 89 is operated by means of a pinion 95 having engagement with the rack teeth 91 and rigidly mounted on a control shaft 96 extending forwardly through the front wall of the head casing. A hand lever 97 (see Fig. 1) is mounted on the outer end of the shaft 96 outwardly of the front portion of the head casing, and may have associated therewith an indicating quadrant 98 to guide the operator in selecting the desired feed combination for the work to be done.

A group of intermediate feed-change gears 99, 100, 101, and 102, having constant mesh respectively with the gears 85, 86, 87, and 88, are rigidly mounted on a shaft 103 having suitable bearings in the sub-structure outer plate and the bearing bracket. The intermediate shaft 103 also carries a rigidly mounted gear 104. A third shaft 105 is provided in the bearing bracket 82 and the outer plate 80, the shaft extending outwardly through the latter. A pair of gears 106 and 107 are freely mounted on the shaft 105, the gear 106 having constant mesh with the gear 104 on the intermediate shaft, and the gear 107 having constant mesh with one of the other intermediate gears 101. The gears 106 and 107 are spaced part, and are provided at the inner ends of their respective hub portions with clutch teeth adapted to be engaged selectively by the complementary clutch teeth of a longitudinally slidable collar 108 keyed on the shaft 105.

The position of the clutch collar is controlled by means of a conventional shifting yoke 109 rigidly supported upon a rod 110 having longitudinally slidable bearings in the sub-structure outer plate and the bearing bracket. Rigidly secured on the end of the rod 110 is a cam collar 111 provided with an angularly disposed cam slot 112 within which is engaged the angularly arranged free end of a cam lever 113. The lever 113 is rigidly mounted on a stub shaft 114 having suitable bearing in the side wall of the head casing and extending therethrough to receive an operating lever 115 extending forwardly towards the front face of the head casing.

The outer plate 80 of the feed-change gear supporting sub-structure carries an annular hub 116 concentric with the shaft 105 and through which extends the end of that shaft. Mounted on the hub 116 is a swinging housing 117 having a pivotal bearing thereon. Within the housing is provided a pair of pick-off change feed gears, the housing being divided to provide a removable cover over the gears. A driving pick-off gear 118 is mounted on the end of the shaft 105 and removably secured thereto by means of the nut 119 threaded on the end of the shaft. A driven pick-off gear 120 in mesh with the driving gear 119 is similarly removably mounted on a shaft 121 having its bearings in the walls of the swinging housing, the latter shaft extending outwardly of the housing and carrying at its end a rigidly secured pinion 122. The pick-off gears 118 and 120 may be readily replaced with others which are paired in various ratios of teeth to give desired feed changes to the longitudinal travel of the tool spindle.

The pinion 122 is adapted for selective engagement, by the swinging of the housing 117 with a gear 123 (see Fig. 3) mounted on the shaft 124 having stationary bearings in the walls of the head casing 8. The shaft 124 extends outwardly of the opposite side of the head casing and carries a rigidly mounted pinion 125 which is constantly in mesh with an internal gear 126 rigidly mounted on a shaft 127 extending through the head casing and having suitable bearings in the walls thereof. The shaft 127 is provided within the casing with a pinion 128 which is in constant mesh with the teeth of a rack bar 129 carried by the spindle sleeve 13. The spindle sleeve bearing 10 is cut away adjacent to the pinion 128 to expose the rack teeth for engagement by the pinion. Mounted on the shaft 124 outwardly of the gear 123 is a spider armed hand wheel 130 by which the spindle sleeve may be manually operated in its longitudinal movement.

Engagement between the pinion 122 and gear 123 is accomplished by means of the swinging of the pick-off gear housing 117, the latter being provided with a forwardly extending member 131 provided at its end with a handle 132 in convenient position for manipulation by an operator positioned before the machine. To engage the pinion 122 and gear 123 the handle 132 is raised to swing the gear housing, and is retained in raised position by means of a latch device comprising a lever 133 pivoted on the forwardly projecting arm 131, one arm of the lever extending along side the handle 132 and confining therebetween a coiled spring 134 tending to force the adjacent arm of the lever away from the handle. The opposite arm of the lever 133 is provided with a lateral notch which engages a stud 135 rigidly positioned upon the side wall of the head casing, the notch and stud being normally retained in engaged relation by means of the spring 134.

To manually disengage the feed driving train, the operator may release the lever 133 from the stud 135 and lower the arm 131, thus swinging the pick-off gear housing to disengage the pinion 122. Automatic provision is made for releasing the lever 133 from the stud 135 and disengaging the spindle feed gears, to permit a predetermined limitation of the lowermost position of the tool spindle in the operation of sinking the tool in the work to a desired depth.

The automatic release mechanism includes a link 136 pivotally secured to the notched end of the lever 133 and pivotally attached also to the crank 137 rigidly mounted on a shaft 138 extending through and having its bearings in the side walls of the head casing. The opposite end of the shaft 138 carries a rigidly mounted crank 139 (see Figs. 1 and 3) having a slot in its free end in which is operatively positioned a pin carried by a crank arm 140 mounted on the shaft 127 outwardly of the internal gear 126. The crank arm 140 has a screw threaded bearing on the shaft 127, so that with the rotation of the latter the crank arm travels longitudinally of the shaft. Outwardly of the crank arm 140 is an adjustable clutch stop collar 141. The stop collar 141 and the adjacent face of the crank arm 140 are each provided with a clutch tooth adapted for interengagement when the crank arm has traveled outwardly into position for such engagement.

Upon engagement of the stop collar with the crank arm the latter is caused to rotate with the shaft thereby swinging the cranks 139 and 137 and the link 136, whereby the notched lever 133 is withdrawn from the stud 135 and the pick-off gear housing 117 swings downwardly to disengage the pinion 122 from the gear 123 and thereby release the spindle sleeve 13 from the feed driving train. By adjustment of the stop collar 141 in its position on the shaft 127, the downward travel of the sleeve 13 may be limited to any desired point.

The sleeve 13 and spindle 11 are counterbalanced in their feed movement by means of a chain 142 secured to a suitable sheave on the shaft 127 and wound thereupon in the downward travel of the spindle sleeve. The chain 142 extends over an idler sheave 143 into the interior of the supporting column 2 and carries a suitable counter-weight 144 suspended at its end.

It will be obvious that I have provided an improved construction of spindle supporting and operating mechanism particularly adapted for compact assembly in multi-unit machines in which all of the manually operated control devices are readily accessible to an operator positioned before the machine, and in which I have provided improved means for the automatic control of the cycles of operation of the spindle.

I claim as my invention:

1. In a machine tool, the combination of a closed casing substantially in the form of a right isosceles triangle positioned with one of its sides vertical, a pair of spindle bearings positioned one at the upper and lower extremities respectively of said side, a spindle in said bearings, change-speed mechanism geared to said spindle, said mechanism including a pair of shafts mounted in said casing in horizontally spaced relation and substantially parallel to the sloping upper side wall of said casing so as to provide a relatively large space between said shafts and the vertical forward wall of said casing, and gear mechanism operable to feed said spindle including feed-change gearing providing a plurality of feeding speeds, said gear mechanism being positioned as a removable unit within said casing between said change-speed mechanism and said vertical forward wall.

2. A machine tool having, in combination, a column, a work supporting table in front of said column, a casing on said column projecting forwardly therefrom over said table and providing vertically aligned and spaced bearings over said table, a rotatable spindle vertically movable in said bearings, said casing having a removable upper wall sloping downwardly and rearwardly from the upper one of said bearings, means for rotating said spindle at a plurality of different speeds including a plurality of shafts, bearing means for supporting said shafts within said casing in horizontally spaced relation adjacent said rearwardly sloping upper wall, said bearing means being arranged to permit removal of said shafts when said wall is removed, said casing having a removable side wall, and feeding means for said spindle including a plurality of horizontal shafts having a plurality of gears thereon and constituting a unit carried by said removable side wall, said last mentioned shafts and gears being arranged so that they may be removably positioned within said casing beneath said sloping drive shafts.

3. In a machine tool, the combination of a closed hollow casing substantially in the form of a right isosceles triangle positioned with one of its sides vertical, means providing a pair of spaced spindle bearings, a spindle in said bearings, change-speed mechanism geared to said spindle, said mechanism including a plurality of shafts mounted in said casing in horizontally spaced relation adjacent the sloping upper wall of said casing so as to provide a relatively large space between said shafts and the vertical forward wall of said casing, and spur-gear spindle feeding mechanism including means for providing a plurality of feeding speeds for said spindle, said spur-gear mechanism being removably positioned as a unit within said housing between said change-speed mechanism and said vertical forward wall.

4. In a machine tool, the combination of a closed casing having a rearwardly and downwardly inclined end wall and parallel side walls, one of said side walls being removable, a vertical spindle rotatably and slidably mounted in the forward portion of said casing, speed-change mechanism geared to said spindle to rotate the latter, said mechanism including parallel horizontally spaced shafts extending closely along and inside of said rear wall, a feeding unit for feeding said spindle axially, said unit comprising speed-change means and feed reversing means mounted on the inside of said removable side wall, and means mounted on the opposed side wall for adjusting said last two mentioned means.

5. In a machine tool, the combination of a closed casing substantially in the form of a right triangle, and having an upper wall sloping downwardly and rearwardly, a vertical spindle rotatably mounted in the front of said casing, change-speed mechanism geared to said spindle, said mechanism including a pair of shafts mounted in said casing closely along said wall, a gear in said casing operatively geared to said spindle for rotation therefrom, a second gear in said casing operatively connected to said spindle for feeding the latter axially, a bearing structure normally positioned within said casing and removably secured for outward withdrawal therefrom, a gear case pivotally mounted on said structure, and an intermediate change-feed gearing mounted in part on said structure and in part in said gear case, said gearing including an inlet gear and an outlet gear, said inlet gear being movable into mesh with said first mentioned gear and said outlet gear being positioned for movement into mesh with said second mentioned gear upon mounting said structure in position in said casing.

6. In a machine tool, the combination of a closed casing, a vertical spindle rotatably mounted in the front of said casing, change-speed mechanism geared to said spindle for rotating the latter, a gear in said casing operatively connected to said spindle for synchronous rotation therewith, a second gear in said casing operatively connected to said spindle for feeding the latter axially, a bearing structure normally positioned within said casing and removably secured for outward withdrawal from one side thereof, a gear case movably mounted on said structure and an intermediate change-feed gearing mounted in part on said structure and in part in said gear case, said gearing including an inlet gear and an outlet gear, said inlet gear being movable into mesh with said first mentioned gear and said outlet gear being positioned for movement into mesh with said second mentioned gear upon mounting said structure in position in said casing.

In testimony whereof, I have hereunto affixed my signature.

ALBERT M. JOHNSON.